United States Patent
Sekigawa

(10) Patent No.: US 11,307,524 B2
(45) Date of Patent: Apr. 19, 2022

(54) SHEET FEEDING APPARATUS, AND IMAGE FORMING APPARATUS

(71) Applicant: CANON KABUSHIKI KAISHA, Tokyo (JP)

(72) Inventor: Akito Sekigawa, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 16/451,312

(22) Filed: Jun. 25, 2019

(65) Prior Publication Data
US 2020/0041946 A1    Feb. 6, 2020

(30) Foreign Application Priority Data

Jul. 31, 2018  (JP) .............................. JP2018-144592

(51) Int. Cl.
*G03G 15/00* (2006.01)
*B65H 5/06* (2006.01)
*H04N 1/00* (2006.01)

(52) U.S. Cl.
CPC ............ *G03G 15/65* (2013.01); *H04N 1/0057* (2013.01)

(58) Field of Classification Search
CPC ...... G03G 15/00; G03G 15/6511; B65H 5/06; H04N 1/0057
See application file for complete search history.

(56) References Cited

U.S. PATENT DOCUMENTS

| | | | |
|---|---|---|---|
| 9,624,057 B2 * | 4/2017 | Itabashi ................... | B65H 5/36 |
| 9,665,055 B2 | 5/2017 | Sekigawa | |
| 9,738,469 B2 | 8/2017 | Sekigawa | |
| 9,932,195 B2 | 4/2018 | Sekigawa | |
| 2014/0084534 A1 * | 3/2014 | Ichikawa ............. | B65H 3/0684 |
| | | | 271/109 |
| 2015/0097334 A1 * | 4/2015 | Sekiguchi ............ | B65H 3/0638 |
| | | | 271/275 |
| 2016/0137439 A1 * | 5/2016 | Kobayashi ......... | G03G 15/6511 |
| | | | 271/117 |
| 2017/0060066 A1 * | 3/2017 | Fujita ................... | B65H 3/0638 |
| 2017/0153590 A1 * | 6/2017 | Yamasaki .......... | G03G 15/6511 |
| 2019/0248614 A1 | 8/2019 | Sekigawa | |

FOREIGN PATENT DOCUMENTS

JP    2016-132528 A    7/2016

* cited by examiner

*Primary Examiner* — Nguyen Q. Ha
(74) *Attorney, Agent, or Firm* — Venable LLP

(57) ABSTRACT

A sheet feeding apparatus includes a sheet stacking portion on which a sheet is stacked, and a conveyance portion to convey the sheet stacked on the sheet stacking portion. The conveyance portion includes a roller to convey the sheet and a shaft supporting the roller. The roller includes an end surface formed on a downstream end side in a detaching direction which is a direction of detaching the roller, an extension portion extending downstream in the detaching direction beyond the end surface, an engage portion formed on the extension portion and engageable with the shaft, and a grip portion extending downstream in the detaching direction beyond the end surface and disposed outside, in a radial direction orthogonal to the axial direction, from the extension portion. The grip portion includes a hole portion penetrating through in the radial direction.

18 Claims, 10 Drawing Sheets

SHEET FEEDING APPARATUS, AND IMAGE FORMING APPARATUS

BACKGROUND OF THE INVENTION

Field of the Invention

The present invention relates to a sheet feeding apparatus, and an image forming apparatus.

Description of the Related Art

Hitherto, there is widely known a retard separation type sheet feeding apparatus in which each roller of a pickup roller, a feed roller and a retard roller is removably attached to a cantilever roller shaft from an aspect of readiness of replacement as disclosed in Japanese Patent Application Laid-open No. 2016-132528 for example. The roller described in Japanese Patent Application Laid-open No. 2016-132528 is provided with an engage portion provided on a roller shaft side and a grip portion capable of releasing an engagement of the engage portion provided on the roller with an engaged portion engageable with the engage portion.

In an image forming apparatus described in Japanese Patent Application Laid-open No. 2016-132528, rollers used in the apparatus are downsized more and more from a late demand on downsizing of the apparatus. Along with the progress of downsizing, the grip portion to be hooked by fingers in removing the roller also tends to be downsized.

However, because the grip portion to be hooked by the fingers is downsized when the roller is downsized in the image forming apparatus described in Japanese Patent Application Laid-open No. 2016-132528, an amount of finger hooking the grip portion also decreases. As a result, there is a problem that an operator's fingers may slip in replacing the roller, thus causing a drop of workability in replacing the rollers.

SUMMARY OF THE INVENTION

According to a first aspect of the present invention, a sheet feeding apparatus, includes a sheet stacking portion on which a sheet is stacked, and a conveyance portion configured to convey the sheet stacked on the sheet stacking portion. The conveyance portion includes a roller configured to convey the sheet and a shaft supporting the roller. The roller can be detached from one end in an axial direction of the shaft along the axial direction. The roller includes an end surface formed on a downstream end side in a detaching direction which is a direction of detaching the roller, an extension portion extending downstream in the detaching direction beyond the end surface, an engage portion formed on the extension portion and engageable with the shaft, and a grip portion extending downstream in the detaching direction beyond the end surface and disposed outside, in a radial direction orthogonal to the axial direction, from the extension portion. The grip portion includes a hole portion penetrating through in the radial direction.

According to a second aspect of the present invention, a sheet feeding apparatus, includes a sheet stacking portion on which a sheet is stacked, and a conveyance portion configured to convey the sheet stacked on the sheet stacking portion. The conveyance portion includes a roller configured to convey the sheet and a shaft supporting the roller. The roller can be detached from one end in an axial direction of the shaft along the axial direction. The roller includes an end surface formed on a downstream end side in a detaching direction which is a direction of detaching the roller, an extension portion extending downstream in the detaching direction beyond the end surface, an engage portion formed on the extension portion and engageable with the shaft, and a grip portion extending downstream in the detaching direction beyond the end surface and disposed outside, in a radial direction orthogonal to the axial direction, from the extension portion. The grip portion includes a depressed portion depressed from an outside surface in the radial direction of the grip portion to inside of the grip portion in the radial direction.

Further features of the present invention will become apparent from the following description of exemplary embodiments with reference to the attached drawings.

DESCRIPTION OF THE EMBODIMENTS

First Embodiment

Overall Configuration

Figure 1:
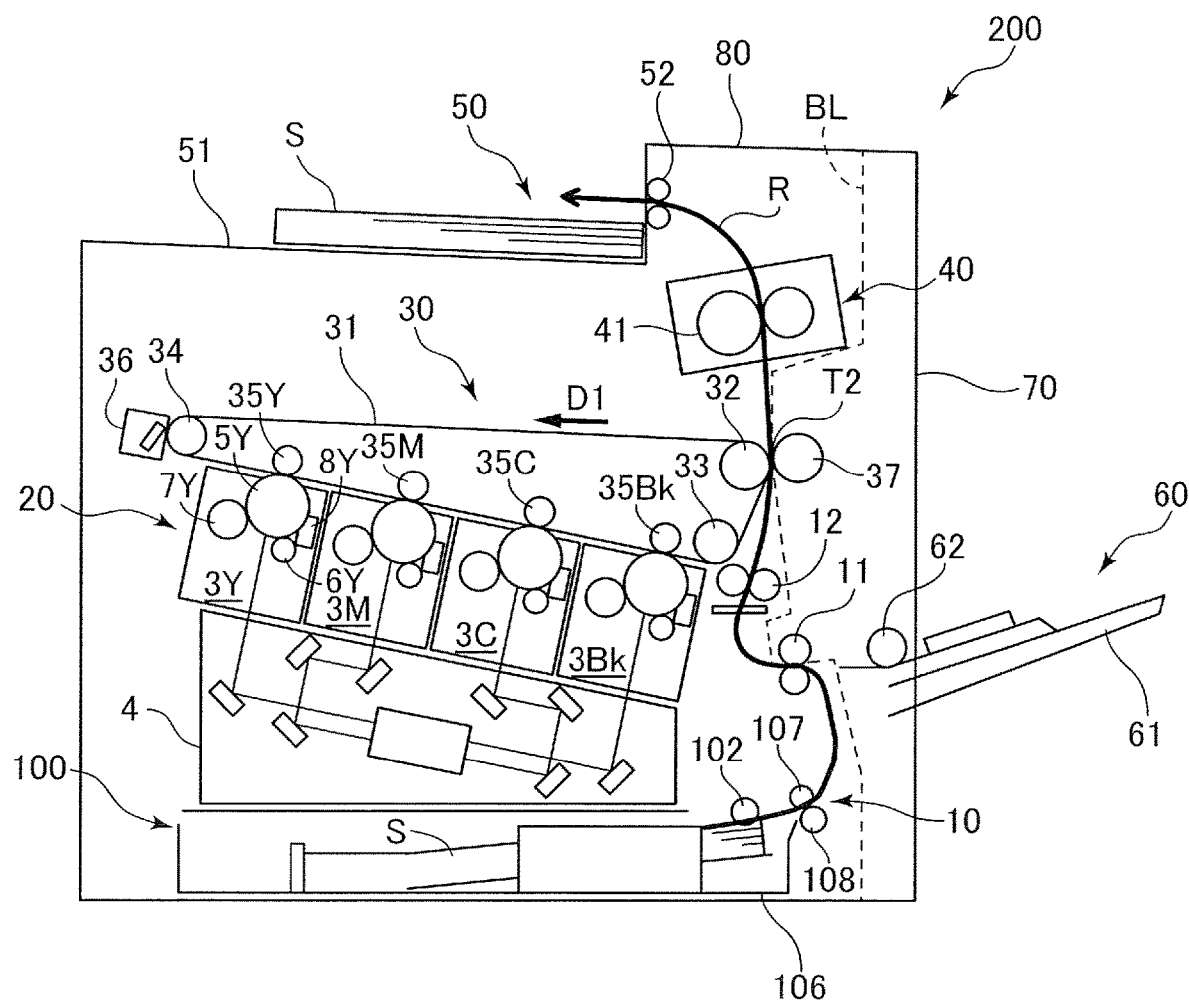
FIG. 1 is a schematic diagram illustrating a configuration of an image forming apparatus of an embodiment of the present disclosure.

Firstly, a first embodiment of the present disclosure will be described with reference to FIG. 1. A printer 200 serving as an image forming apparatus of the first embodiment is a full-color laser beam printer. As illustrated in FIG. 1, the printer 200 includes a sheet feeding apparatus 100, an image forming unit 20, a fixing unit 40 including a fixing roller pair 41 and a heat source not illustrated and a discharge portion 50 including a discharge tray 51 and a discharge roller pair 52.

The sheet feeding apparatus 100 includes a cassette 106 and a manual feed tray 61 serving as sheet stacking portions for stacking a sheet S and feed portions 10 and 60 feeding the sheet S. The cassette 106 is disposed at a lower part of the printer 200 for example as illustrated in FIG. 1 and is configured to be able to insert into/draw out of an apparatus body 80. The sheet S to be fed toward the image forming unit 20 by the feed portion 10 is stored in the cassette 106 in a condition of being stacked. The feed portion 10 includes a pickup roller 102, a feed roller 107, a retard roller 108 and shafts not illustrated and supporting the pickup roller 102, the feed roller 107 and the retard roller 108, respectively. The feed portion 60 is disposed as a manual feed portion enabling to set an indefinite size sheet. The feed portion 60 includes a feed roller 62 serving as a roller for feeding the sheet stacked on the manual feed tray 61 serving as a sheet stacking portion and a shaft not illustrated and supporting the feed roller 62.

The image forming unit 20 is a so-called four-drum full color type image forming unit and forms toner images of four colors of yellow (Y), magenta (M), cyan (C) and black (Bk). The image forming unit 20 includes process units 3Y, 3M, 3C and 3Bk, an exposure unit 4, an intermediate transfer unit 30 and a secondary transfer portion T2. The process unit 3Y includes a photosensitive drum 5Y serving as a photosensitive member, a charger 6Y, a developer 7Y and a cleaning unit 8Y and thus composes an image forming station forming a yellow (Y) toner image. It is noted that the respective process units 3M, 3C and 3Bk have the same configuration with that of the process unit 3Y and compose image forming stations forming magenta (M), cyan (C) and black (Bk) toner images, respectively.

The intermediate transfer portion 30 includes an intermediate transfer belt 31, a secondary transfer inner roller 32, a tension roller 33 and a stretch roller 34, and primary transfer rollers 35Y, 35M, 35C and 35Bk. The intermediate transfer belt 31 is wrapped around the secondary transfer inner roller 32, the tension roller 33 and the stretch roller 34 and is rotationally driven by the tension roller 33 so as to rotate in a direction of an arrow D1 illustrated in FIG. 1. Provided in contact with an outer circumferential surface of the intermediate transfer belt 31 is a belt cleaning unit 36 removing adhesive materials such as toner left on the intermediate transfer belt 31.

The primary transfer rollers 35Y, 35M, 35C and 35Bk are disposed respectively on an inner circumferential side of the intermediate transfer belt 31 so as to face the respective photosensitive drums. The primary transfer rollers 35Y, 35M, 35C and 35Bk are pressed, through the intermediate transfer belt 31, toward the respective photosensitive drums to which the primary transfer rollers face respectively. Thereby, a primary transfer nip portion is defined between each of the photosensitive drums and the intermediate transfer belt 31.

Provided in contact with an outer circumferential surface of the secondary transfer inner roller 32 through the intermediate transfer belt 31 is a secondary transfer roller 37. A secondary transfer portion T2 in which the toner images borne on the intermediate transfer belt 31 are transferred onto a sheet S is defined between the secondary transfer roller 37 and the secondary transfer inner roller 32.

Provided on a side part (right side in FIG. 1) of the printer 200 is a cover 70 openable/closable bordering on a broken line BL with respect to an apparatus body 80. The cover 70 is attached to the apparatus body 80 such that a conveyance path R guiding the sheet S from the feed portion 10 or 60 to the discharge portion 50 is exposed in a state in which the cover 70 is opened by considering workability such as removal of a jammed sheet.

Receiving a command to start an image forming operation, the photosensitive drum 5Y rotates such that a surface of the photosensitive drum 5Y is homogeneously charged by the charger 6Y in the process unit 3Y in the printer 200 constructed as described above. Then, the exposure unit 4 outputs a laser beam modulated based on image data inputted from an input interface or an external computer not illustrated. As the exposure unit 4 outputs the laser beam to scan the surface of the photosensitive drum 5Y, an electrostatic latent image based on the image data is formed on the surface of the photosensitive drum 5Y. The electrostatic latent image thus formed is visualized as a toner image of yellow (Y) by toner supplied from the developer 7Y. Toner images of magenta (M), cyan (C) and black (Bk) are also formed in the process units 3M, 3C and 3Bk, respectively, in the same manner with the yellow toner image (Y) formed in the process unit 3Y, and the toner images of the respective colors formed by the image forming unit 20 are primarily transferred, so as to be superimposed with each other, onto the intermediate transfer belt 31 serving as the intermediate transfer member by the primary transfer rollers 35Y, 35M, 35C and 35Bk. Adhesive materials such as toner left on the photosensitive drum 5Y after the primary transfer of the toner image is collected by the cleaning unit 8Y. The same applies to the other photosensitive drums.

In parallel with such image forming operation, the feed portion 10 or 60 feeds the sheet S toward the image forming unit 20. For instance, in a case where the sheet S in a cassette 106 is selected as a sheet onto which an image is to be formed, the feed portion 10 feeds the sheet S stacked in the cassette 106 toward the image forming unit 20. The sheet S fed from the feed portion 10 is conveyed to a registration roller pair 12 via a conveyance roller pair 11. A leading edge of the sheet S conveyed to the registration roller pair 12 abuts with the registration roller pair 12 being stopped, so that a skew thereof is corrected. The sheet S whose skew has been corrected by the registration roller pair 12 is sent to the secondary transfer portion T2 in synchronism with advance of the toner image forming operation.

Along with the rotation of the intermediate transfer belt 31, the toner image borne on the intermediate transfer belt 31 is conveyed to the secondary transfer portion T2 defined between the secondary transfer inner roller 32 and the secondary transfer roller 37. The toner image conveyed to the secondary transfer portion T2 is secondarily transferred onto the sheet S by bias voltage applied to the secondary transfer roller 37. Adhesive materials such as toner left on the intermediate transfer belt 31 after the secondary transfer of the toner image onto the sheet S are removed by the belt cleaning unit 36.

The sheet S onto which the toner image has been transferred is conveyed to the fixing unit 40. The sheet S conveyed to the fixing unit 40 is heated and pressed by a fixing roller pair 41 and a heat source to fix the toner image onto the sheet S. The sheet S on which the toner image has been fixed is discharged to a discharge tray 51 disposed at an upper part of the printer 200 by a discharge roller pair 52.

Sheet Feeding Apparatus

Figure 2:
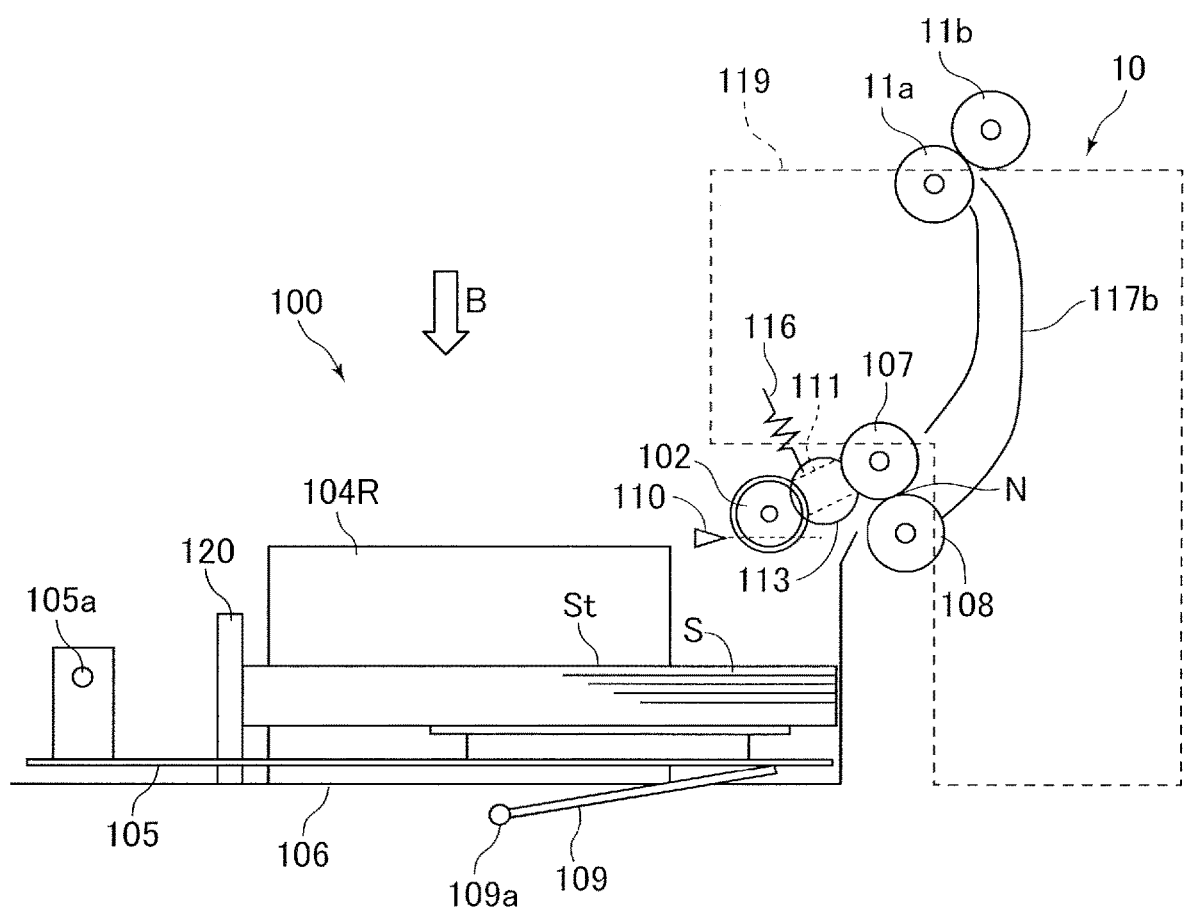
FIG. 2 is a schematic diagram illustrating a configuration of a sheet feeding apparatus of the embodiment.

Next, the sheet feeding apparatus 100 described above (see FIG. 1) will be described in detail. As illustrated in FIG. 2, an elevatable tray 105 and a supporting plate 109 supporting and elevating the tray 105 are disposed within the cassette 106. The tray 105 is configured to be pivotable in a vertical direction centering on a pivot shaft 105a. The supporting plate 109 is disposed between the tray 105 and a bottom plate of the cassette 106. The supporting plate 109 pivots in the vertical direction centering on a pivot shaft 109a by being driven by a driving source not illustrated. As the supporting plate 109 vertically pivots centering on the pivot shaft 109a, the tray 105 vertically elevates/descends centering on the pivot shaft 105a. When the tray 105 rises, the pickup roller 102 is pressed by an uppermost sheet St stacked in the tray 105 and pivots slightly upward, thus positioned at a feed position where the sheet can be fed. Disposed in the vicinity of the pickup roller 102 within the apparatus body is a sheet detecting sensor 110 detecting whether the pickup roller 102 is located at the feed position. That is, the sheet detecting sensor 110 detects whether the sheet S stacked in the tray 105 can be fed by the pickup roller 102.

Figure 3A:
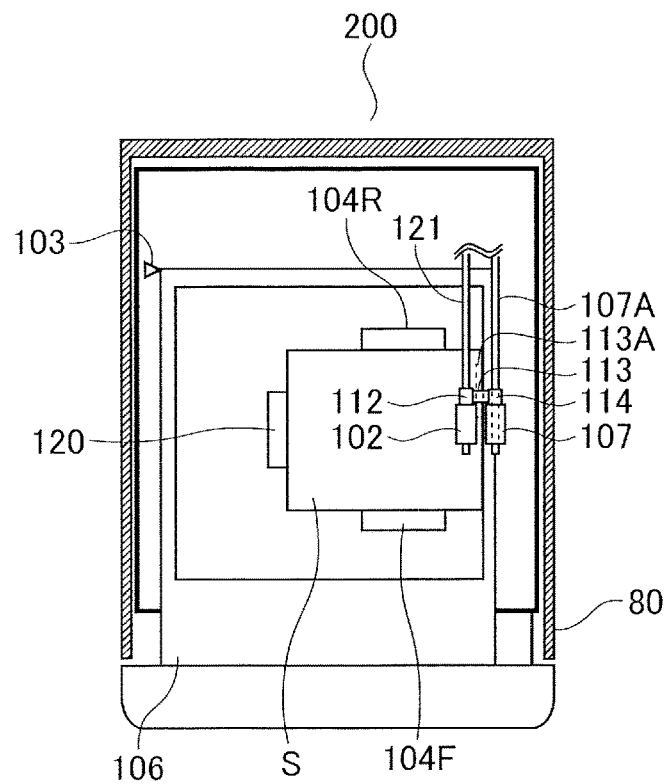
FIG. 3A is a schematic diagram illustrating a feed portion in which a cassette is attached when seen from a direction of arrow B in FIG. 2.
Figure 3B:
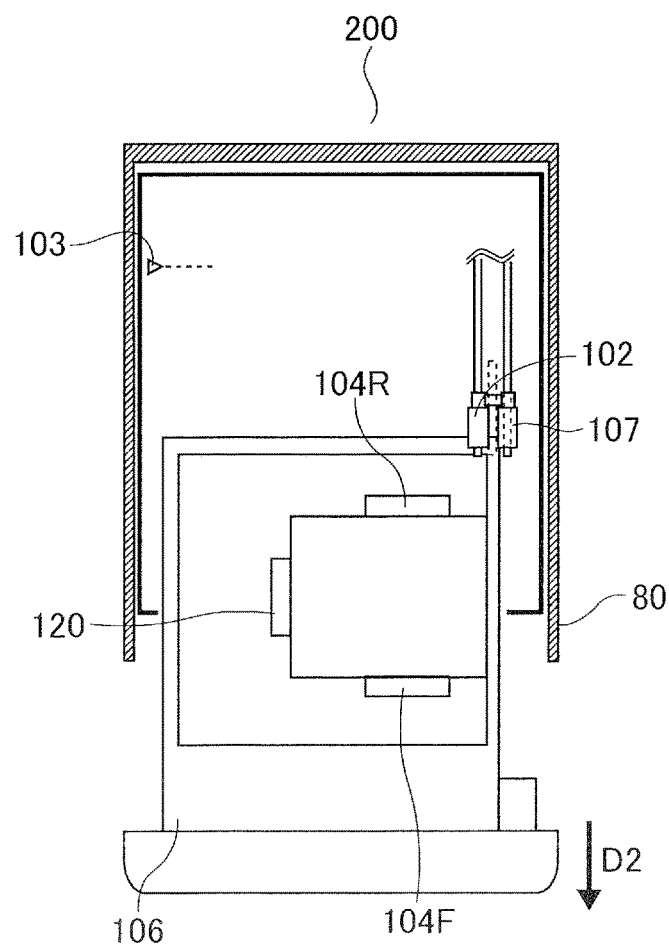
FIG. 3B is a schematic diagram illustrating a feed portion in which the cassette is drawn out when seen from the direction of the arrow B in FIG. 2.

Still further, as illustrated in FIG. 3A, side regulating plates 104F and 104R and a rear-end regulating plate 120 regulating a position of the sheet S stacked in the tray 105 are disposed within the cassette 106. As illustrated in FIG. 3B, the side regulating plates 104F and 104R are disposed so as to face with each other in a direction indicated by an arrow D2, i.e., in a direction in parallel with a direction in which the cassette 106 is drawn out. The side regulating plate 104F is disposed on a side of a front direction in drawing the cassette 106 and the side regulating plate 104R is disposed on a side of a rear direction in drawing the cassette 106. The rear-end regulating plate 120 is disposed upstream in a feed direction of the sheet S, i.e., on a left side in FIG. 3A.

As disclosed in FIGS. 3A and 3B, a cassette detecting sensor 103 that detects whether the cassette 106 is inserted into a predetermined position of the apparatus body 80 is disposed within the apparatus body 80. The cassette detecting sensor 103 detects the cassette 106 in a case where the cassette 106 is inserted into the predetermined position of the apparatus body 80 as indicated in FIG. 3A and is firmly attached in the apparatus body 80. Meanwhile, the cassette detecting sensor 103 does not detect the cassette 106 in a case when the cassette 106 is drawn out of the apparatus body 80 as illustrated in FIG. 3B.

As illustrated in FIG. 2, the feed portion 10 includes the pickup roller 102, the feed roller 107 and the retard roller 108. The two conveyance rollers 11a and 11b composing the conveyance roller pair 11 as illustrated in FIG. 1 are disposed downstream of the conveyance direction of the feed roller 107 and the retard roller 108. Still further, a guide 117b is disposed in the sheet conveyance direction between the feed roller 107 and the retard roller 108 and the conveyance rollers 11a and 11b as the conveyance roller pair. The guide 117b is a member guiding the sheet S delivered by the feed roller 107 and the retard roller 108 to the conveyance rollers 11a and 11b. The guide 117b is supported by a feed frame 119. The feed frame 119 also rotatably supports the pickup roller 102, the feed roller 107, the retard roller 108 and the conveyance rollers 11a and 11b.

As the sheet detecting sensor 110 detects that the pickup roller 102 is located at the feed position, the uppermost sheet St is fed by the pickup roller 102 to the conveyance path R (see FIG. 1) in the sheet feeding apparatus 100. The sheet S fed by the pickup roller 102 is separated one by one by the feed roller 107 and the retard roller 108 and is then guided by the guide 117b to the conveyance roller pair 11.

Next, a drive transmission structure of the pickup roller 102, the feed roller 107 and the retard roller 108 will be described. As illustrated in FIGS. 2 and 3A, cantilever driving shafts 107A and 121 are disposed above the cassette 106, and a driving force from a driving source and a drive transmitting portion not illustrated is transmitted to the driving shaft 107A. The feed roller 107 is rotatably supported by one axial end of the driving shaft 107A. The driving shaft 107A is also provided with an idler gear 114 rotatable in linkage with rotation of the driving shaft 107A.

Figure 4:
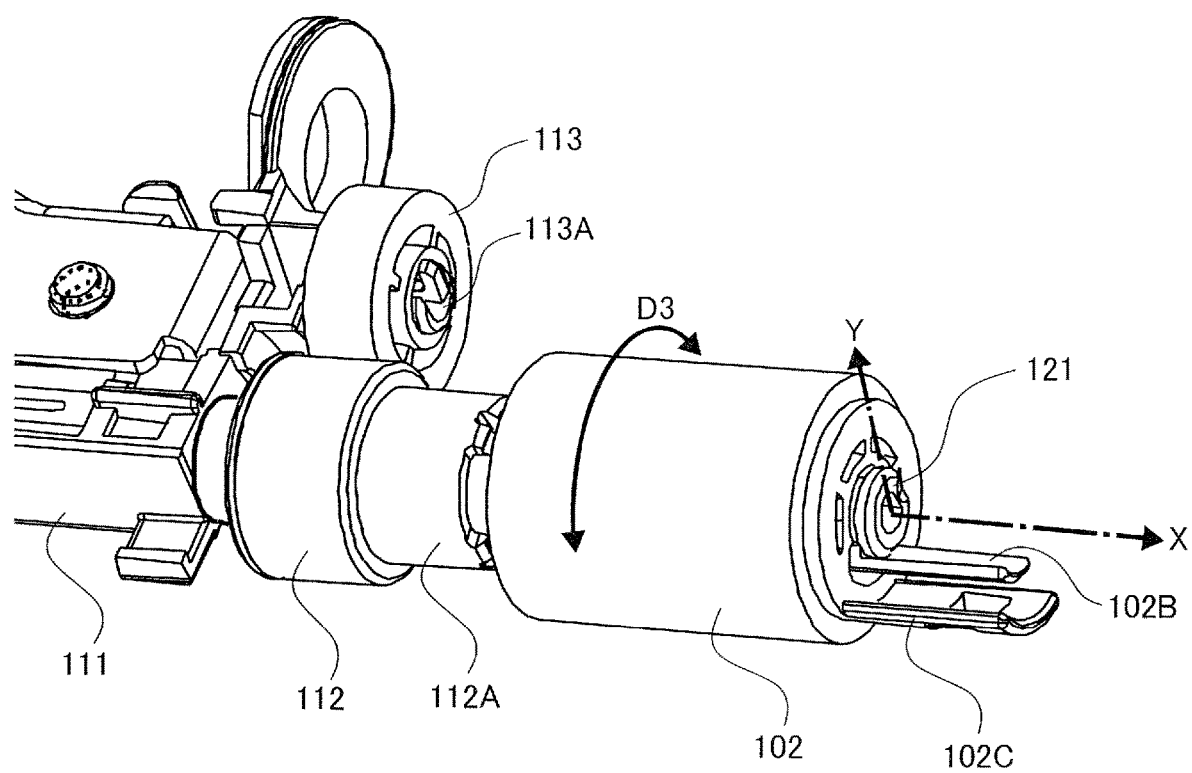
FIG. 4 is a perspective view of a rotary member.

Still further, as illustrated in FIG. 2, a liftable plate 111 is supported by the driving shaft 107A pivotably centering on the driving shaft 107A. A spring 116 urging the liftable plate 111 downward is disposed between the liftable plate 111 and the feed frame 119. Still further, as illustrated in FIG. 4, the liftable plate 111 is provided with an idler shaft 113A and a rotation shaft 121 extending in a direction of X in FIG. 4. The rotation shaft 121 serving as a shaft of the pickup roller is cantilevered by the liftable plate 111 and is provided with an idler gear 112 relatively non-rotatable with the rotation shaft 121. The idler gear 112 is linked with the pickup roller 102 through a coupling mechanism 112A. As illustrated in FIG. 3A, disposed between the idler gear 112 and an idler gear 114 is an idler gear 113 engaging with the both gears. The idler gear 113 is rotatably supported by the idler shaft 113A. The idler gear 114 also rotates together with the driving shaft 107A by the driving force transmitted to the driving shaft 107A. The idler gear 114 transmits the rotation to the idler gear 112 through the idler gear 113. The rotation transmitted to the idler gear 112 is transmitted to the pickup roller 102 through the coupling mechanism 112A to rotate the pickup roller 102 in one direction among circumferential directions of the rotation shaft 121 indicated by an arrow D3.

Still further, as illustrated in FIG. 2, the feed roller 107 is in pressure contact with the retard roller 108. The retard roller 108 receives a torque in a direction inverse to the feed direction of the sheet S, i.e., in a direction toward the left in FIG. 2, through a torque limiter not illustrated. A value of the torque received by the retard roller 108 is set to be greater than a frictional force generated between the sheets S and to be less than a frictional force generated between the sheet S and the feed roller 107. Due to the torque value set as described above, the torque limiter idles in a case where zero or one sheet S enters a nip portion N defined between the feed roller 107 and the retard roller 108, and the retard roller 108 is rotated with the rotation of the feed roller 107. As a result, one sheet S entering the nip portion N is conveyed to the conveyance rollers 11a and 11b. Meanwhile, in a case where two or more sheets S enter the nip portion N, a force inverse to the sheet feed direction is applied to the retard roller 108 to separate the sheets S one by one.

Note that the retard roller 108 is supported by a holder not illustrated so as to come into contact with/to separate from the feed roller 107. As the cassette 106 is drawn out of the apparatus body 80, the retard roller 108 separates from the feed roller 107, and as the cassette 106 is attached to the apparatus body 80, the retard roller 108 comes into contact with the feed roller 107. This arrangement makes it possible to readily draw the feed roller 107 and the retard roller 108 in drawing out the cassette 106, thus improving replaceability.

Rotary Member

Figure 5A:
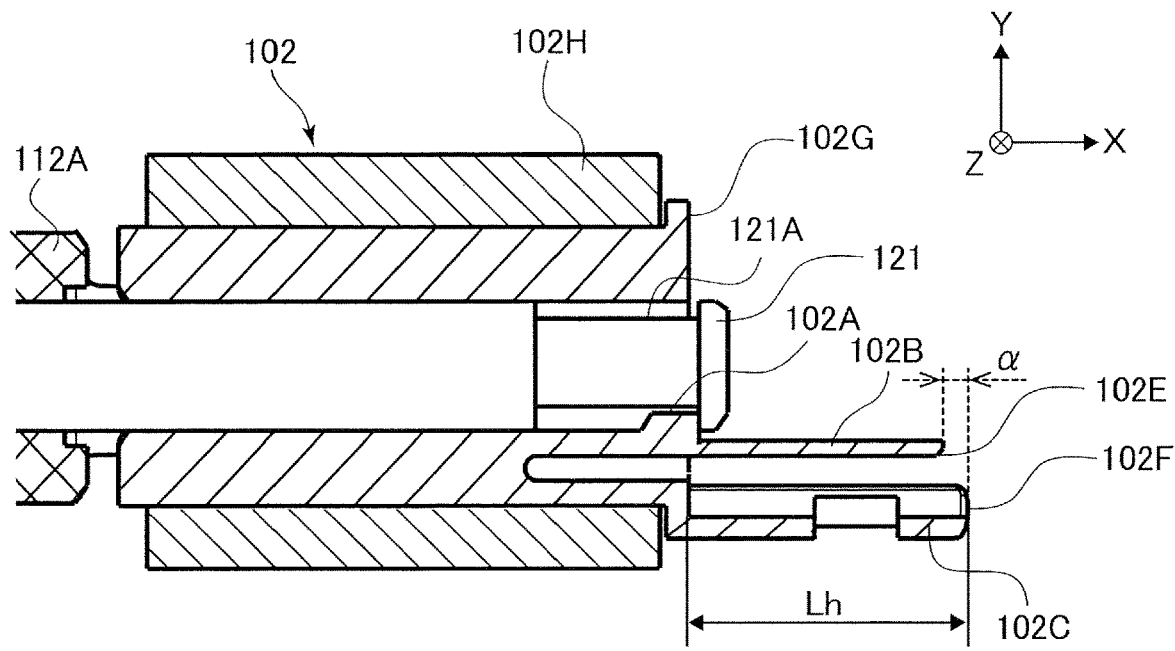
FIG. 5A is a section view illustrating the rotary member in an engage condition.

Next, the pickup roller 102 serving as a rotary member or a roller will be described in detail. Note that one direction among axial directions of the rotation shaft 121 will be denoted as an X-direction, a direction orthogonal to the X-direction will be denoted as a Y-direction, and a direction orthogonal to the X- and Y-directions will be denoted as a Z-direction. The X-direction is a detaching direction of the pickup roller 102, and the Y-direction is a radial direction of the rotation shaft 121. As illustrated in FIG. 5A, the pickup roller 102 is supported rotatably by the rotation shaft 121. Defined at one end in the X-direction of the rotation shaft 121 is a groove 121A formed such that a radius thereof is smaller than other parts of the rotation shaft 121. The pickup roller 102 includes an end surface 102G an extension portion 102B, an engagement ratchet 102A serving as an engagement portion, a grip portion 102C and an outer circumferential portion 102H.

Figure 5B:
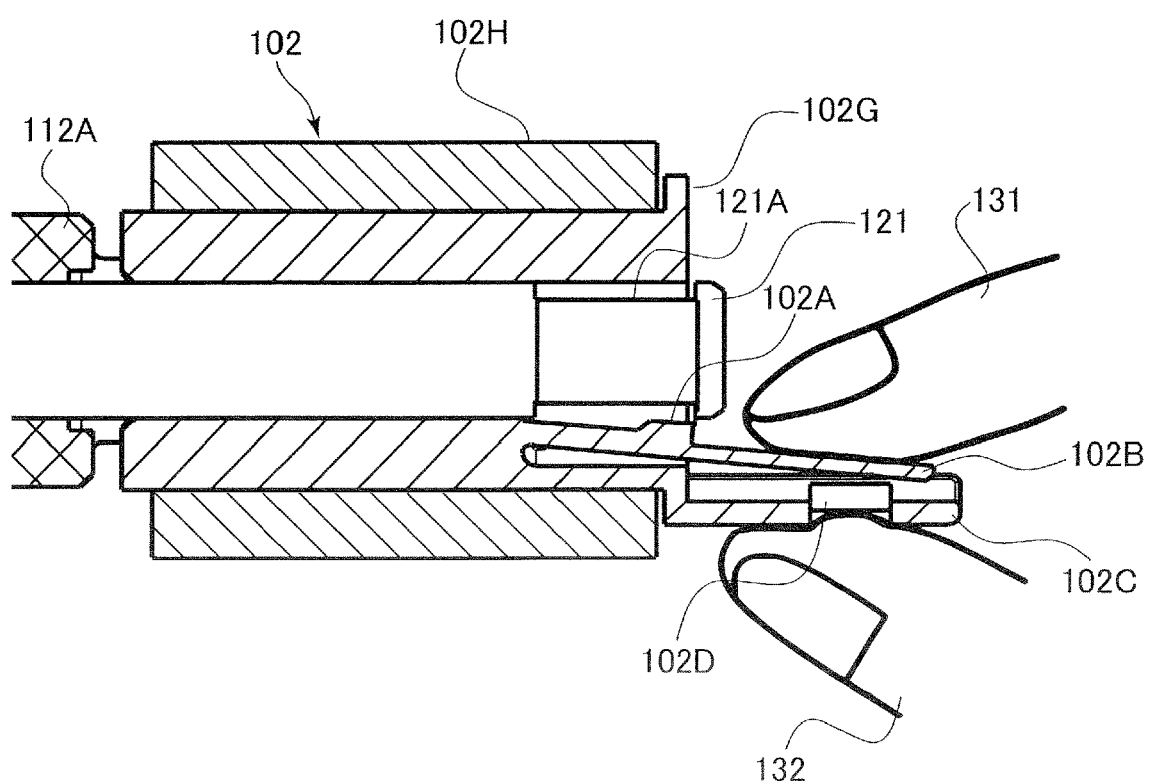
FIG. 5B is a section view illustrating the rotary member in a disengage condition.

The end surface 102G is formed at a downstream end in the X-direction of the rotation shaft 121. The extension portion 102B is formed so as to extend downstream in the X-direction beyond the end surface 102G The extension portion 102B is provided with the engagement ratchet 102A formed to be engagable with the groove 121A. The extension portion 102B is configured to be elastically deformable in a direction opposite to the Y-direction, i.e., toward outside in the radial direction, as illustrated in FIG. 5B by thinning a base end portion thereof.

The grip portion 102C extends downstream in the X-direction of the end surface 102G and is disposed outside in the Y-direction of the extension portion 102B. A length Lh in the X-direction of the grip portion 102C, i.e., a length from the end surface 102G to a grip portion tip 102F, is longer than a length in the X-direction of the extension portion 102B, i.e., a length from the end surface 102G to an extension portion tip 102E, by a mm. This arrangement is made by considering workability in attaching and detaching the pickup roller 102. An outer circumferential portion 102H is formed of a cylindrical material such as rubber and can convey the sheet S by rotating in contact with the sheet S.

Figure 6:
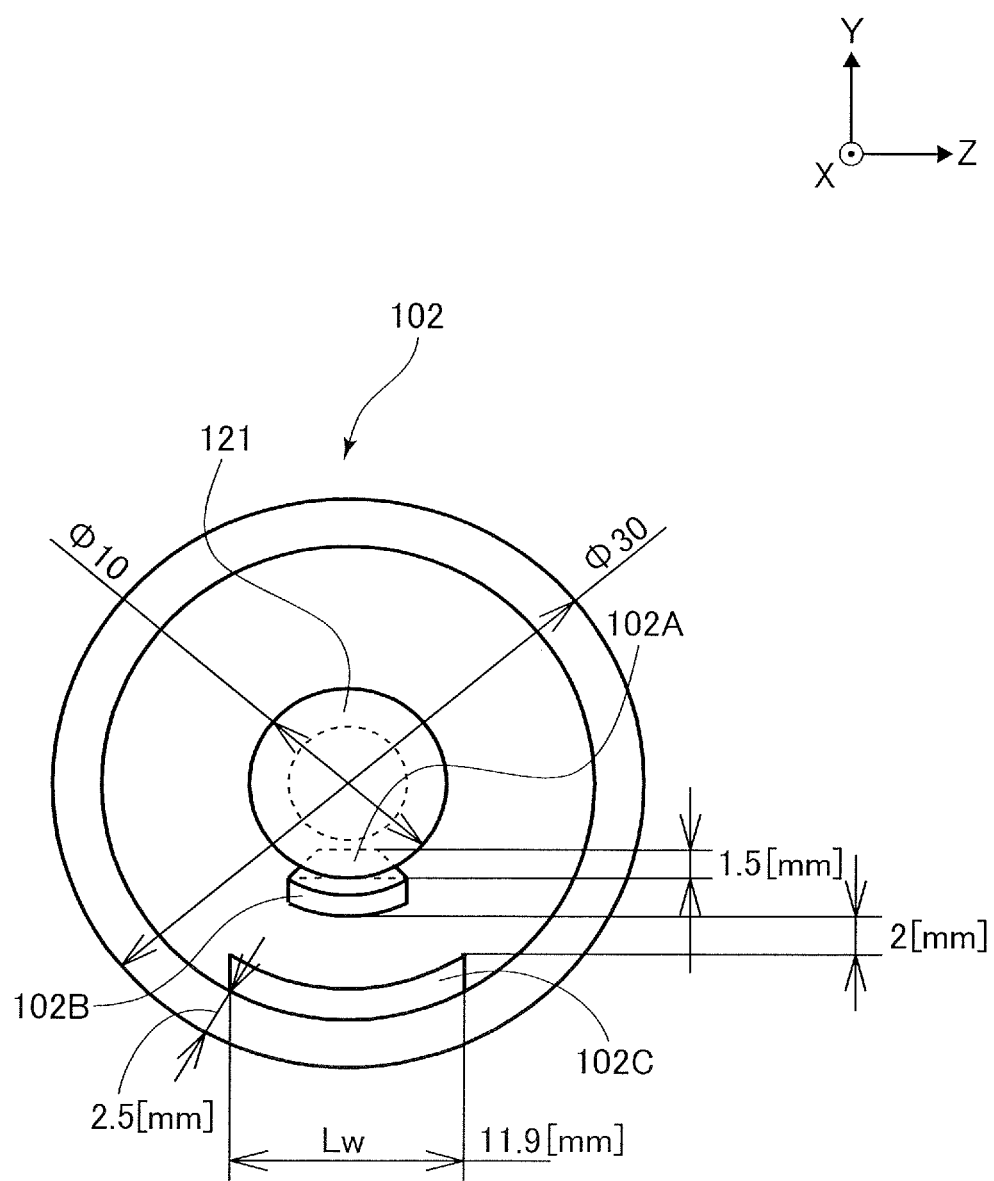
FIG. 6 is a schematic diagram illustrating the rotary member when seen from a detach direction of the shaft and illustrates a dimensional relationship.

In the present embodiment, a diameter of the rotation shaft 121 is 10 mm as illustrated in FIG. 6. As for the pickup roller 102, a diameter is 30 mm, an engagement amount of the engagement ratchet 102A engaging with the groove 121A (see FIG. 5A) is 1.5 mm and a distance between the extension portion 102B and the grip portion 102C is 2 mm. As for both end positions in the Z-direction of the grip portion 102C, at least 2.5 mm is assured from the outer circumferential surface of the outer circumferential portion 102H (see FIG. 5A) toward a radial inner side, i.e., to a center side. This length of 2.5 mm is a length necessary to prevent a conveyance failure otherwise caused by the grip portion 102C coming into contact with the sheet in conveying the sheet. A length of the outer circumferential portion 102H in an axial direction of the rotation shaft 121 is 25 mm. Thus, the pickup roller 102 and the rotation shaft 121 of the present embodiment are relatively small, and the grip portion 102C is also downsized along with the downsized pickup roller 102.

Figure 7:
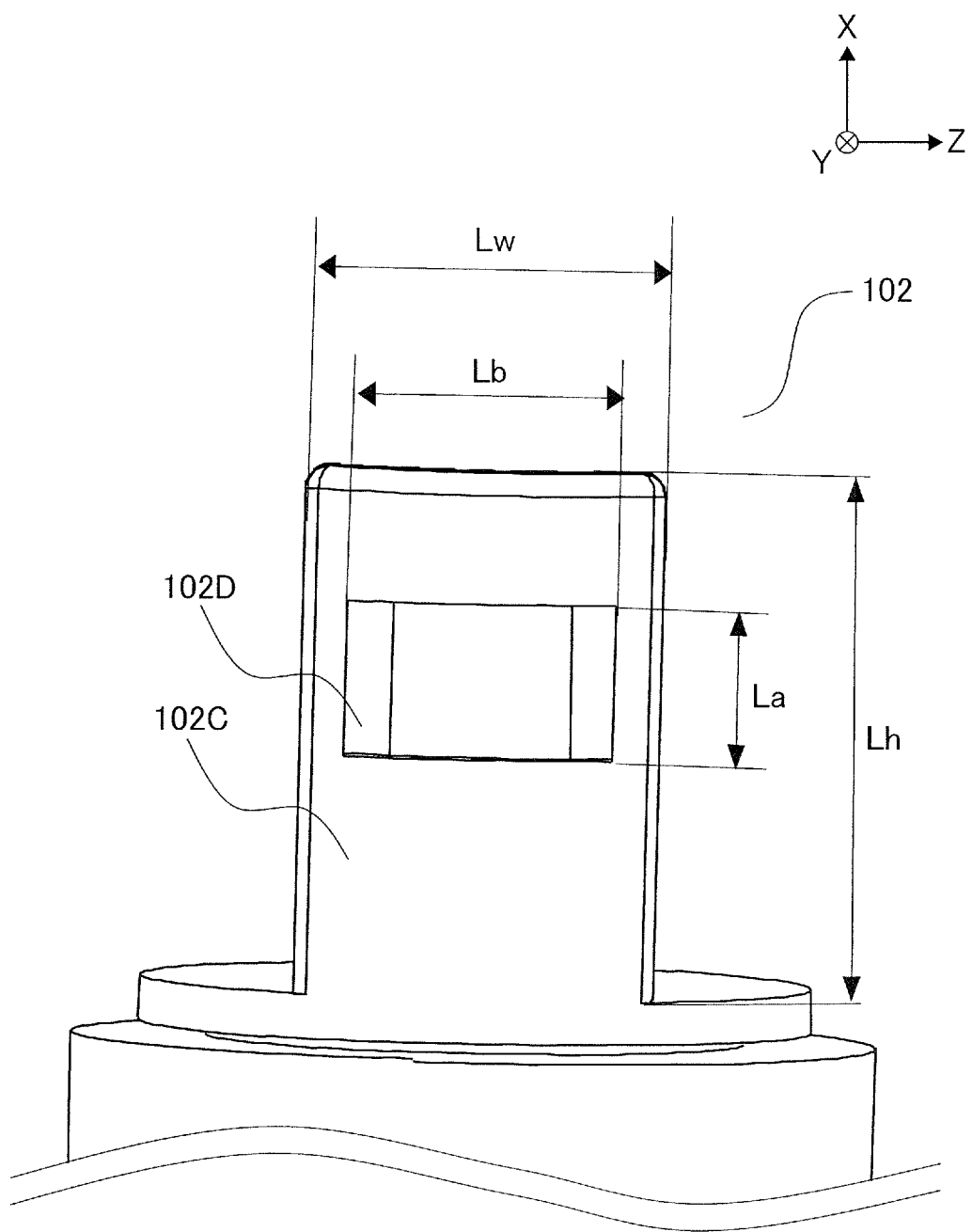
FIG. 7 is a perspective view of a grip portion of the rotary member.

A maximum dimension of a circumferential length Lw that can be taken in the Z-direction of the grip portion 102C is 11.9 mm in the case of the pickup roller 102 and the rotation shaft 121 exemplified in FIG. 6. The length of 11.9 mm is 70% or less of about 17 mm which is an average width of a thumb of adult Japanese. In a case of a rotary member in which no hole portion 102D is provided under a condition in which the length Lw of the grip portion 102C is shorter than 11.9 mm, frequency of slipping off a finger increases because a degree of hooking the grip portion by the finger is weakened in pinching the grin portion. Then, in order to improve readiness in hooking the grip portion 102C by the finger even if the grip portion 102C has a same size, the hole portion 102D is defined in the grip portion 102C as illustrated in FIG. 7 in the present embodiment. That is, the grip portion 102C includes the rectangular hole portion 102D that penetrates from an outer surface to an inner surface in the radial direction, i.e., in the Y-direction.

Preferably, the hole portion 102D is defined such that a length of one side in the axial direction (referred to as an 'axial length' hereinafter) La and a length of one side in an orthogonal direction orthogonal to the axial direction (referred to as a 'circumferential length' hereinafter) Lb are at least 3 mm and 4 mm, respectively. This configuration is made so that a fingertip of a user is firmly hooked by the grip portion 102C in a case where the hole portion 102D is defined such that the axial length La is 3 mm or more and the circumferential length Lb is 4 mm or more. That is, the fingertip is more readily hooked by the grip portion 102C and the attachment/detachment operation of the pickup roller 102 can be made readily for many users more than a case where the hole portion 102D is defined such that the axial length La is 3 mm or less and the circumferential length Lb is 4 mm or less.

Still further, as for the size of the grip portion 102C in which the hole portion 102D is defined, a length from an outer edge of the grip portion 102C to an edge of the hole portion 102D is desirable to be at least 1.5 mm in context of strength and others. By considering a preferable range described above, the size of the grip portion 102C is set such an axial length Lh and a circumferential length Lw are at least 4.5 mm and 7 mm, respectively. From the configuration described above, the grip portion 102C exemplified in FIG. 7 is formed into a rectangular shape having the axial length Lh and peripheral length Lw of at least 4.5 mm and 7 mm, respectively. Then, the grip portion 102C includes the hole portion 102D defined such that the axial length La and the circumferential length Lb are set at least 3 mm and 4 mm, respectively.

Meanwhile, in a case where the diameter of the pickup roller 102 is determined to a specific size such as 30 mm for example, size the grip portion 102C in which the hole portion 102D is defined is limited. For instance, if the circumferential length Lw of the grip portion 102C exceeds 11.9 mm in the pickup roller 102 illustrated in FIG. 6, conveyance failure may occur depending on a condition of friction of the outer circumferential portion 102H (see FIG. 5A). Therefore, it is more preferable to set the circumferential length Lw of the grip portion 102C at 11.9 mm even in maximum from an aspect of suppressing frequency of causing the conveyance failure of the sheet to be low. Still further, in the case where the length of 1.5 mm from the outer edge of the grip portion 102C to the edge of the hole portion 102D described above is assured, it is more preferable to set the circumferential length Lb of the hole portion 102D at 8.9 mm even in maximum. That is, as for preferable ranges of the axial length La and the circumferential length Lb of the hole portion 102D, it is a range of 3 mm or more and 11 mm or less for the axial length La and it is a range of 4 mm or more and 8.9 mm or less for the circumferential length Lb. As for preferable ranges of the grip portion 102C, it is a range of 4.5 mm or more and 12.5 mm or less for the axial length Lh and it is a range of 7 mm or more and 11.9 mm or less for the circumferential length Lw.

It is also preferable to set the axial length Lh of the grip portion 102C to be less than a half of the axial length of the outer circumferential portion 102H (see FIG. 5A). It is because if the axial length of the grip portion 102C is too long, the center of gravity of the pickup roller 102 moves downstream in the detaching direction and the pickup roller 102 is apt to incline with respect to the rotation shaft 121. If the pickup roller 102 is used in a condition of being inclined with respect to the rotation shaft 121, the pickup roller 102 may come into contact with the sheet S unevenly, thus causing uneven abrasion or a skew of the sheet. Therefore, it is preferable to set the range of the axial length Lh of the grip portion 102C not to cause the condition in which the pickup roller 102 is inclined with respect to the rotation shaft 121. More specifically by exemplifying the pickup roller 102 as illustrated in FIG. 6, it is preferable to set the axial length Lh of the grip portion 102C at 12.5 mm even in maximum because the axial length of the outer circumferential portion 102H (see FIG. 5A) is set to be 25 mm. Still further, in the case where at least 1.5 mm of length is assured from the outer edge of the grip portion 102C to the edge of the hole portion 102D as described above, the axial length La of the hole portion 102D is preferable to be 11 mm in maximum.

In short, the axial length La of the hole portion 102D is preferable to be at least 3 mm and is more preferable to be in a range of 3 mm or more and 11 mm or less. The circumferential length Lb of the hole portion 102D is preferable to be at least 4 mm and is more preferable to be in a range of 4 mm or more and 8.9 mm or less. The axial length Lh of the grip portion 102C is preferable to be at least 4.5 mm and more preferable to be in a range of 4.5 mm or more and 12.5 mm or less. The circumferential length Lw of the grip portion 102C is preferable to at least 7 mm and more preferable to be in a range of 7 mm or more and 11.9 mm or less.

Attachment and Detachment of Rotary Member

Next, detachment and attachment operations of the pickup roller 102 serving as the rotary member will be described. Before the description, a condition in which the engagement ratchet 102A is engaged with the groove 121A as illustrated in FIG. 5A will be called as an 'engage condition', and a condition in which the engagement ratchet 102A is separated from the groove 121A as illustrated in FIG. 5B will be called as a 'release condition' hereinafter.

In a case of detaching the pickup roller 102 constructed as described above out of the rotation shaft 121, the user firstly draws the cassette 106 out of the apparatus body 80 in the front direction indicated by the arrow D2 as illustrated in FIG. 3B. As the cassette 106 is drawn out, a workspace for enabling to access to the pickup roller 102 from the front direction of the apparatus body 80 is assured. At this time, the pickup roller 102 is in a condition of normal use, i.e., in the engage condition in which the engagement ratchet 102A engages with the groove 121A as illustrated in FIG. 5A. In the engage condition, the pickup roller 102 can rotate without being pulled out of the rotation shaft 121.

Figure 8:
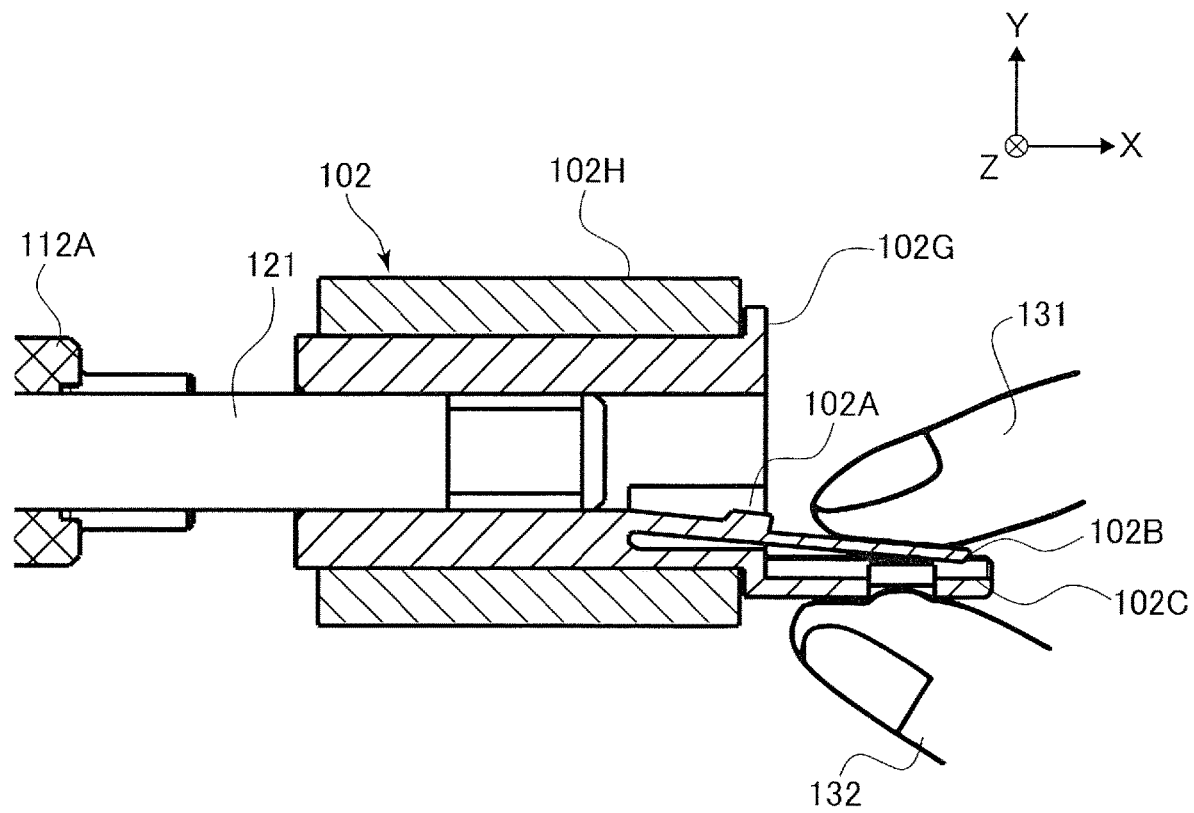
FIG. 8 is a section view illustrating the rotary member in the disengage state.

Next, the user pinches the extension portion 102B and the grip portion 102C as illustrated in FIG. 5B for example and elastically deforms the extension portion 102B in a direction opposite from the Y-direction. For instance, the user pinches the extension portion 102B and the grip portion 102C by hooking the extension portion 102B with his/her fingertip 131 of a forefinger and the grip portion 102C with his/her fingertip 132 of a thumb, the extension portion 102B deflects toward the grip portion 102C. As the extension portion 102B deflects toward the grip portion 102C, the engagement ratchet 102A is disengaged from the groove 121A, and the engage condition of the pickup roller 102 is released. That is, the pickup roller 102 changes to the disengage condition. Next, the user pulls out the pickup roller 102 in the X-direction, i.e., in the detaching direction, while pinching the extension portion 102B and the grip portion 102C, i.e., in the disengage condition, as illustrated in FIG. 8. Then, the pickup roller 102 moves in the X-direction and is detached from the rotation shaft 121.

Note that the pickup roller 102 can be attached to the rotation shaft 121 by inversely conducting the detachment procedure described above. More specifically, the pickup roller 102 is moved in a direction opposite to the X-direction by inserting one end in the X-direction, i.e., the detaching direction of the rotation shaft 121, while pinching the extension portion 102B and the grip portion 102C as illustrated in FIG. 8. Then, when the pickup roller 102 is inserted into a position where the engagement ratchet 102A can engage with the groove 121A as illustrated in FIG. 5B, the user releases the fingertip 131 of the forefinger and the fingertip 132 of the thumb respectively from the extension portion 102B and the grip portion 102C. Then, as illustrated in FIG. 5A, the engagement ratchet 102A engages with the groove 121A and the attachment of the pickup roller 102 is completed.

As described above, the hole portion 102D (see FIG. 7) is defined in the grip portion 102C to enable the user to hook the finger in attaching/detaching the pickup roller 102. Therefore, the grip portion 102C can be hooked more readily by the finger when the user pinches the grip portion 102C by the fingers, thus improving replaceability of the pickup roller 102. Still further, the pickup roller 102 is provided with the grip portion 102C disposed outside of the extension portion 102B as described above. Accordingly, when the extension portion 102B is elastically deformed in the direction opposite to the Y-direction, the grip portion 102C disposed outside of the extension portion 102B functions as a stopper regulating an amount of deflection of the extension portion 102B when it is pressed radially outside of the pickup roller 102 as illustrated in FIG. 8. The arrangement of the extension portion 102B and the grip portion 102C described above makes it possible to suppress the amount of defection of the engagement ratchet 102A from deflecting more than a predetermined amount and to prevent the engagement ratchet 102A from being damaged, e.g., from being broken for example.

Superiority in terms of the readiness in hooking the grip portion 102C by the finger becomes remarkable as the diameter of the pickup roller 102 is reduced as compared to a rotary member in which no hole portion 102D is provided. For instance, in a case where the grip portion 102C is formed to a size which is hardly hooked by the fingers in a case where the diameter of the pickup roller 102 is 30 mm or less, it is less than 70% of the average width of a thumb of the adult Japanese. In this case, if a rotary member is provided with no hole portion 102D, frequency of slipping off fingers increases because a degree of hooking the grip portion by the finger in gripping the grip portion is weak.

However, in the case of the pickup roller 102 of the present embodiment, the amount of hooking the hole portion 102D by the finger is large even if the size of the grip portion 102C is decreased. Accordingly, it is possible to keep the frequency of slipping off the finger low because the grip portion 102C is readily hooked by the finger even in a case where the diameter of the pickup roller 102 is in a range of more than 0 mm and 30 mm or less. Therefore, the pickup roller 102 of the present embodiment is advantageous in downsizing the sheet feeding apparatus and the image forming apparatus.

Second Embodiment

Figure 9:
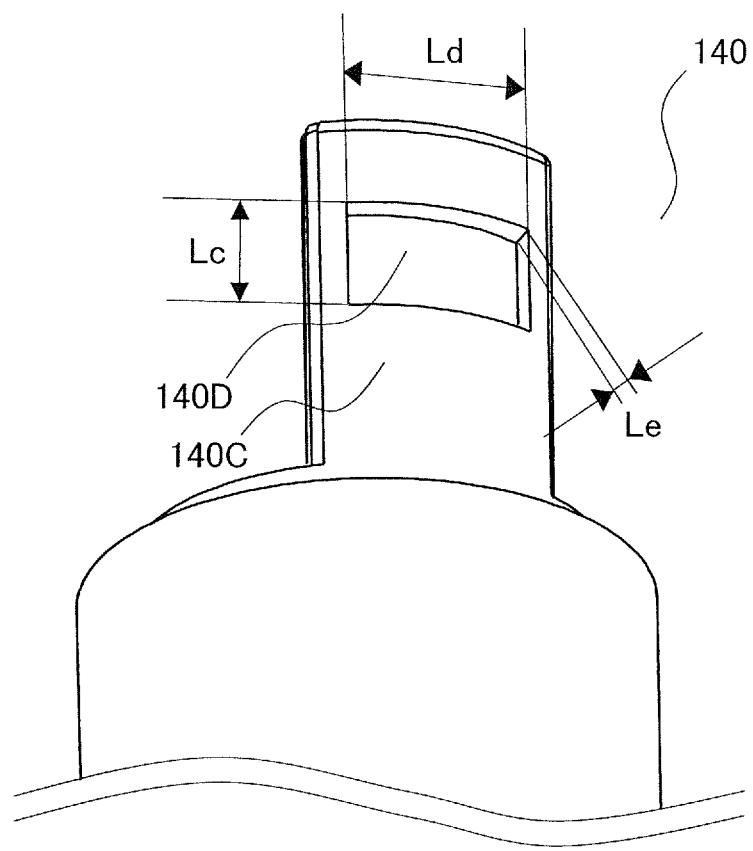
FIG. 9 is a perspective view of the rotary member in the modified example.
Figure 10:
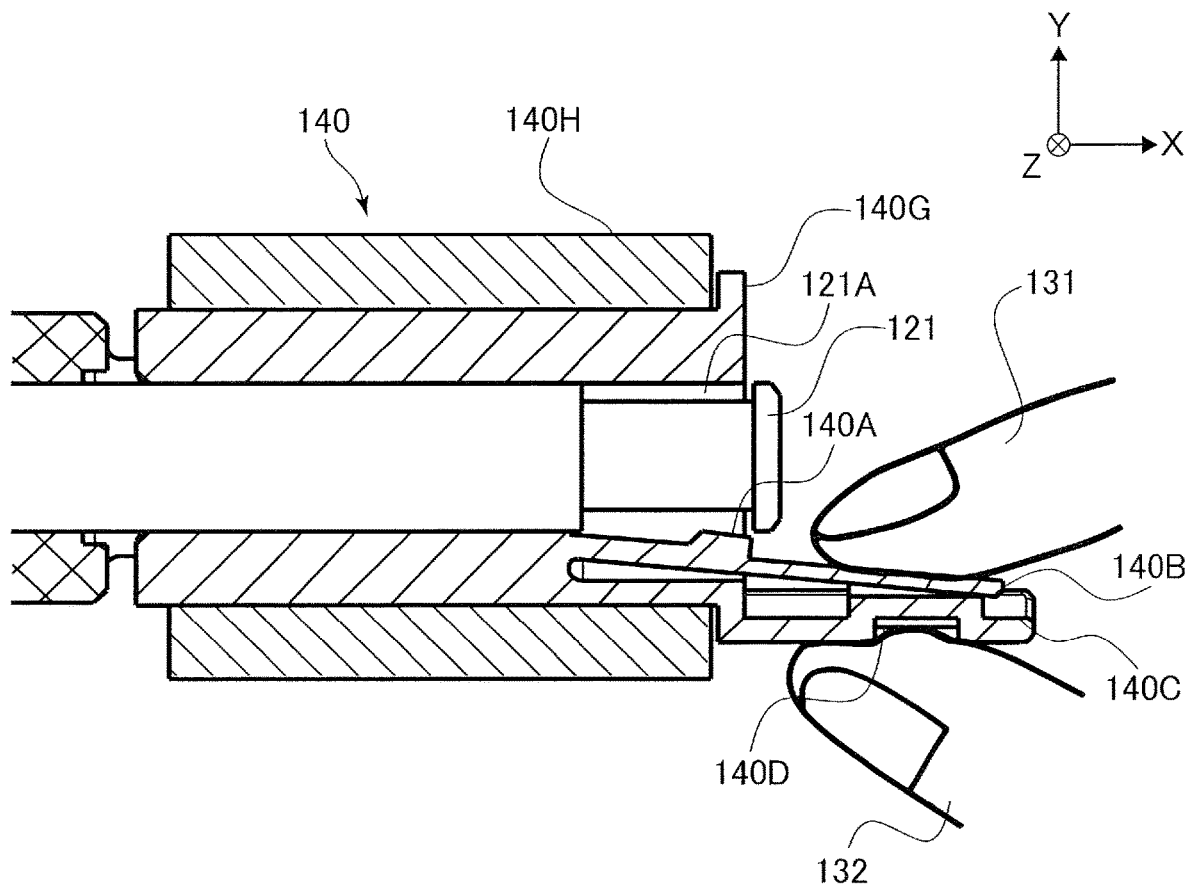
FIG. 10 is a section view of a rotary member of a modified example.

Next, a second embodiment of the present disclosure will be described. While the second embodiment is different from the first embodiment in that a pickup roller 140 including a non-through depressed portion 140D is provided as illustrated in FIG. 9 described later instead of the hole portion 102D (see FIG. 7) of the first embodiment, the other points are substantially the same with the first embodiment. As illustrated in FIG. 10, the pickup roller 140 includes an end surface 140O the extension portion 140B, the engagement ratchet 140A serving as an engage portion, a grip portion 140C in which the depressed portion 140D is defined and an outer circumferential portion 140H. The end surface 140O the extension portion 140B, the engagement ratchet 140A and the outer circumferential portion are constructed in the same manner respectively with the end surface 1020 the extension portion 102B, the engagement ratchet 102A and the outer circumferential portion 102H described above.

The grip portion 140C will be described in detail. In FIG. 9, a front direction of a sheet surface of FIG. 9 is radially outside of the rotation shaft 121, and a surface of the grip portion 140C in which the depressed portion 140D is defined is a radially outside surface of the rotation shaft 121. As illustrated in FIG. 9, the grip portion 140C includes the depressed portion 140D. An axial length Lc and a circumferential length Ld of the depressed portion 140D correspond respectively to the axial length La and the circumferential length Lb of the hole portion 102D (see FIG. 7). Accordingly, the axial length Lc of the depressed portion 140D is at least 3 mm and is more preferably in a range of 3 mm or more and 11 mm or less. The circumferential length Ld of the depressed portion 140D is at least 4 mm and is more preferably in a range of 4 mm or more and 8.9 mm or less.

A depth Le of the depressed portion 140D is formed to be at least 0.5 mm and more preferably to be 1 mm or more. It is because in a case where the depth Le of the depressed portion 140D is 0.5 mm, a fingertip of many users can be firmly hooked by the grip portion 140C. That is, the grip portion 140C is hooked more readily by the fingertip, and the attachment/detachment operation of the pickup roller 102 can be readily made, as compared to a case where the depth Le of the depressed portion 140D is defined to be less than 0.5 mm, for many users. In a case where the depth Le of the depressed portion 140D is defined to be 1 mm, many users could readily make the attachment/detachment operation of the pickup roller 102 as compared to the case when the depth Le was 0.5 mm. Therefore, it is preferable to set the depth Le of the depressed portion 140D at least at 0.5 mm and more preferable at 1 mm or more from the aspect of assuring the depth of firmly hooking the grip portion 140C. Note that because the depressed portion 140D does not penetrate through the grip portion 140C, the depth Le is equal to or less than the thickness of the grip portion 140C in maximum.

As described above, the depressed portion 140D is defined in the grip portion 140C to be hooked by the finger of the user in attaching/detaching the pickup roller 140. Besides the side surfaces of the depressed portion 140D, the pickup roller 140 can be constructed such that the fingertip comes into contact even with a bottom surface, an area of the grip portion 140C coming into contact with the fingertip can be enlarged. Therefore, the user can hook the grip portion 140C firmly by the fingertip, thus enhancing operability in attaching/detaching the pickup roller 140.

It is noted that the present disclosure is not limited as it is to the embodiments described above and may be embodied variously other than the examples described above. That is, the present disclosure can be modified by omitting, replacing or changing various parts within a scope not departing from the gist of the present disclosure. For instance, the present disclosure can be applied by appropriately changing the size, material, shape and their relative disposition corresponding to a configuration of an apparatus and to various conditions.

While the cases in which the present disclosure is applied to the pickup roller 102 and 140 have been described in the embodiments described above, the present disclosure may be also applied to a roller other than the pickup rollers 102 and 140 such as the feed roller 107, the retard roller 108 and the feed roller 62. Not only the roller, the present disclosure is also applicable to a rotary member other than the rollers disposed in each photosensitive drum and in the image forming apparatus such as a gear transmitting the drive.

While the case where the hole portion 102D (see FIG. 7) and the depressed portion 140D (see FIG. 9) are defined in the rectangular shape have been described in the embodiments, the shape of the hole portion 102D and the depressed portion 140D is not always limited to the rectangular. For instance, the hole portion 102D and the depressed portion 140D may be formed into a polygonal shape other than a circle, an oval or a rectangular shape, as long as the grip portion can be hooked by the fingertips in pinching the grip portion by the fingertips. Note that in a case where the hole portion 102D and the depressed portion 140D is defined in a shape other than the rectangular shape, the depressed portion and the hole portion may be defined by a standard of dimensions of the same degree in defining in the rectangular shape. That is, the depressed portion and the hole portion may be defined such that the range of the axial and orthogonal lengths in defining the hole portion 102D and the depressed portion 140D in the rectangular shape become ranges of longest lengths in the axial and orthogonal directions of the depressed portion and the hole portion to be defined.

More specifically, it is possible to set at least at 3 mm as a preferable length of the longest length in the axial direction and is possible to set a range, as a more preferable range, of 3 mm or more and 11 mm or less. Still further, it is possible to set at least at 4 mm as a preferable length of the longest length in the orthogonal direction and is possible to set a range, as a more preferable range, of 4 mm or more and 8.9 mm or less. In a case where the depressed portion and the hole portion to be defined is circular, longest parts in the axial and orthogonal directions correspond to a diameter. A range of the diameter may be made common in ranges of the longest parts in the axial and orthogonal directions. That is, a preferable diameter is at least 4 mm which is equal with the preferable length of the longest part in the orthogonal direction and a more preferable range of the diameter is a range of 4 mm or more which is the same with the preferable range of the length of the longest part in the orthogonal direction and 8.9 mm or less.

While the printer 200 has been described as one example of the image forming apparatus in the embodiments described above, the present disclosure is also applicable to a jet-ink type image forming apparatus that forms an image on a sheet by injecting ink drops from nozzles.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-144592, filed Jul. 31, 2018, which is hereby incorporated by reference herein in its entirety.

What is claimed is:
1. A sheet feeding apparatus, comprising:
a sheet stacking portion on which a sheet is stacked; and
a conveyance portion configured to convey the sheet stacked on the sheet stacking portion,
wherein the conveyance portion comprises a roller configured to convey the sheet and a shaft supporting the roller,
wherein the roller can be detached from one end in an axial direction of the shaft along the axial direction, the roller comprising:

an end surface formed on a downstream end side in a detaching direction which is a direction of detaching the roller;

an extension portion extending downstream in the detaching direction beyond the end surface;

an engage portion formed on the extension portion and engageable with the shaft; and a grip portion extending downstream in the detaching direction beyond the end surface and disposed outside, in a radial direction orthogonal to the axial direction, from the extension portion, and wherein the grip portion comprises a hole portion penetrating through in the radial direction.

2. The sheet feeding apparatus according to claim 1, wherein a length of a longest part in the axial direction of the hole portion is 3 mm or more and 11 mm or less, and a length of a longest part in an orthogonal direction orthogonal to the axial direction is 4 mm or more and 8.9 mm or less.

3. The sheet feeding apparatus according to claim 1, wherein the hole portion is defined in a rectangular shape having one side, in the axial direction, of 3 mm or more and 11 mm or less and having one side, in an orthogonal direction orthogonal to the axial direction, of 4 mm or more and 8.9 mm or less.

4. The sheet feeding apparatus according to claim 1, wherein the grip portion is formed into a rectangular shape having one side, in the axial direction, of 4.5 mm or more and 12.5 mm or less and having one side, in an orthogonal direction orthogonal to the axial direction, of 7 mm or more and 11.9 mm or less.

5. The sheet feeding apparatus according to claim 1, wherein a diameter of the roller is more than 0 mm and is 30 mm or less.

6. The sheet feeding apparatus according to claim 1, wherein the extension portion is elastically deformable in the radial direction and separates the engage portion from the shaft by elastically deforming radially outside.

7. The sheet feeding apparatus according to claim 1, wherein the extension portion and the grip portion respectively extend along a circumferential direction of the shaft.

8. An image forming apparatus comprising:
the sheet feeding apparatus as set forth in claim 1; and
an image forming unit configured to form an image on a sheet fed from the sheet feeding apparatus.

9. A sheet feeding apparatus, comprising:
a sheet stacking portion on which a sheet is stacked; and
a conveyance portion configured to convey the sheet stacked on the sheet stacking portion,
wherein the conveyance portion comprises a roller configured to convey the sheet and a shaft supporting the roller,
wherein the roller can be detached from one end in an axial direction of the shaft along the axial direction, the roller comprising:
an end surface formed on a downstream end side in a detaching direction which is a direction of detaching the roller;
an extension portion extending downstream in the detaching direction beyond the end surface;
an engage portion formed on the extension portion and engageable with the shaft; and
a grip portion extending downstream in the detaching direction beyond the end surface and disposed outside, in a radial direction orthogonal to the axial direction, from the extension portion, and
wherein an outside surface of the grip portion in the radial direction comprises a first edge portion provided at a downstream end of the grip portion in the detaching direction and extending in a circumferential direction of the shaft, a second edge portion provided at one end of the grip portion in the circumferential direction, extending in the detaching direction, and connected with the first edge portion, and a third edge portion provided at the other end of the grip portion in the circumferential direction, extending in the detaching direction, and connected with the first edge portion, wherein the outside surface of the grip portion has only one depressed portion surrounded by the first, second, and third edge portions, and when viewed in the radial direction, the depressed portion is depressed inward in the radial direction relative to the first, second, and third edge portions, wherein in a cross-section of the grip portion taken along the axial direction, a length of a bottom surface of the depressed portion in the axial direction is longer than a length of the first edge portion in the axial direction, and wherein when viewed in the radial direction, a length of the bottom surface of the depressed portion in the circumferential direction is longer than a length of the second edge portion in the circumferential direction and a length of the third edge portion in the circumferential direction.

10. The sheet feeding apparatus according to claim 9, wherein a length of a longest part in the axial direction of the depressed portion is 3 mm or more and 11 mm or less and a length of a longest part in an orthogonal direction orthogonal to the axial direction is 4 mm or more and 8.9 mm or less, and a depth in the radial direction of the depressed portion is 0.5 mm or more and is less than a thickness in the radial direction of the grip portion.

11. The sheet feeding apparatus according to claim 9, wherein the depressed portion is defined in a rectangular shape having one side, in the axial direction, of 3 mm or more and 11 mm or less and having one side, in an orthogonal direction orthogonal to the axial direction, of 4 mm or more and 8.9 mm or less.

12. The sheet feeding apparatus according to claim 9, wherein the grip portion is formed into a rectangular shape having one side, in the axial direction, of 4.5 mm or more and 12.5 mm or less and having one side, in an orthogonal direction orthogonal to the axial direction, of 7 mm or more and 11.9 mm or less.

13. The sheet feeding apparatus according to claim 9, wherein a diameter of the roller is more than 0 mm and is 30 mm or less.

14. The sheet feeding apparatus according to claim 9, wherein the extension portion is elastically deformable in the radial direction and separates the engage portion from the shaft by elastically deforming radially outside.

15. The sheet feeding apparatus according to claim 9, wherein the extension portion and the grip portion respectively extend along the circumferential direction of the shaft.

16. An image forming apparatus comprising:
the sheet feeding apparatus as set forth in claim 9; and
an image forming unit configured to form an image on a sheet fed from the sheet feeding apparatus.

17. The sheet feeding apparatus according to claim 9, wherein the first, second, and third edge portions form raised peripheral boundaries of the depressed portion.

18. The sheet feeding apparatus according to claim 9, wherein the depressed portion is a substantially flat surface bordered by the first, second, and third edge portions.

\* \* \* \* \*